United States Patent Office 3,488,319
Patented Jan. 6, 1970

3,488,319
REINFORCED POLYMERIC COMPOSITIONS AND
PROCESS OF PREPARATION THEREOF
Robert E. Miller, St. Louis, Mo., assignor to Monsanto
Company, a corporation of Delaware
No Drawing. Filed Mar. 26, 1964, Ser. No. 355,108
Int. Cl. C08g 51/04, 41/02
U.S. Cl. 260—47                                    3 Claims

ABSTRACT OF THE DISCLOSURE

Reinforced polymeric compositions comprising polymer, reinforcing agent and cardboxylated alkoxysilane coupling agents. Process for preparing the above compositions comprising treating a reinforcing agent with the silane coupler and conducting a polymerization of a monomer in the presence of the treated reinforcing agent. Also disclosed are certain carboxylated alkylene and alkenylene alkoxysilanes.

---

This invention relates to reinforced polymeric compositions. In one aspect, this invention relates to a method of reinforcing polymeric compositions by chemically bonding a reinforcing medium to a polymer molecule through a carboxylated long-chain alkylene alkoxysilane or a carboxylated long-chain alkenylene alkoxysilane. In another aspect, this invention relates to the polymeric compositions produced by the above method. In yet another aspect, this invention relates to carboxylated long-chain alkylene alkoxysilanes and carboxylated long-chain alkenylene alkoxysilanes.

The term "reinforcing agent" or "reinforcing medium" applies to substances subsequently described in detail whenever their incorporation into a polymer system is accompanied by a carboxylated alkoxysilane coupling agent which provides the linkage for the consequent bonding of the polymer and reinforcing agent. This is in distinction to materials which serve only as fillers or diluents for a polymer system. Since the reinforcement produced by the practice of this invention is achieved by chemical bonding which will be described subsequently herein, the term "reinforced polymeric composition" or "reinforced polymer" refers to those compositions comprising a polymer and reinforcing agent wherein the reinforcing agent is chemically bound to the polymer through a third component referred to as a coupling agent. A coupling agent is a compound containing two or more reactive groups, at least one of which is capable of reaction with the polymer, and at least one of which is capable of reaction with a reinforcing agent. The term "carboxyl group" includes both the carboxy group, —COOH, and the hydrocarbyloxycarbonyl group, —COOR, where R is a monovalent hydrocarbon radical. The term "carboxylated long-chain alkylene and alkenylene alkoxysilanes" is used to refer to silanes described in the generic formula below, i.e. alkoxysilanes wherein carboxy groups are not attached directly to the silicon atom but are separated from the silicon atom by an alkylene or alkenylene radical having from 8 to 20 carbon atoms.

It is well known in the prior art that polymeric compositions can be "filled" with non-polymeric substances, i.e. materials which do not enter into the polymerization process can be mixed with the monomer feed or polymer product to form a uniform finished product. Initially, various fillers were used in a polymeric material to color the polymer, change the coefficient of expansion, improve abrasion resistance, modulus and strength, and to dilute the polymer thereby lowering its costs. It is common practice to admix a filler and polymer in several ways in order to effect a mechanical bond between the two components. One method has been to mix thoroughly a monomer and filler and subsequently polymerize the monomer, thereby producing a composition wherein the filler is intimately dispersed throughout the finished product. Another method has been to subject uncured polymer and filler to a shearing force whereby the filler is forced into a type of mechanical bond with the polymer upon curing. Various other methods of achieving mechanical bonding of filler to polymer are also well known in the art.

The upper limit of filler that can be used in such mechanical mixtures without adversely affecting the physical properties of the product is low. The tensile and flexural strengths, particularly of some polymer systems, fall off sharply at relatively low concentrations of filler. An exception to this generalization has been the use of fibrous material, particularly fibrous glass particles, in polymeric compositions. Incorporation of fibrous glass into a polymer increases physical properties significantly. As yet, marked improvement has not been achieved by the use of granular material. The decrease in strength exhibited by granularly filled polymers is believed to be due to the fact that a particulate filler in a polymer is not a component comparable to the polymer in load-bearing characteristics. Rather the polymeric constituent is primarily determinative of the tensile and flexural strengths and moduli of the composition. Therefore, a filled polymeric product, which contains less polymer per unit volume of the product than an unfilled polymer, ordinarily possesses mechanical properties inferior to the unfilled polymer, particularly at granular filler concentrations of about 50% or more. Nevertheless, several polymer-granular filler systems have been developed for various reasons such as cost reduction, heat resistance, etc.

It has now been discovered that by achieving chemical bonding of polymer and granular inorganic mineral, the inorganic material no longer acts as a mere filler but actually becomes part of the polymeric composition. In this invention, the mechanical properties of the polymer do not decrease with increasing proportions of granular filler, but rather are improved significantly at high proportions of reinforcing agent.

This reinforcement of polymeric compositions by means of granular particles as distinguished from fibrous particles is a desirable feature since a granular mineral-monomer or prepolymer mixture in more fluid, hence more easily cast or molded, than a mixture containing an equivalent amount of fibrous material. However, reinforcement by means of fibrous materials, such as fibrous glass, which are chemically bound to polymers through a coupling agent, is also a significant feature of this invention.

It has been discovered that reinforcing agents, when chemically bonded to polymers, provide compositions with mechanical properties superior to compositions wherein the reinforcing agent is merely physically intermixed with the polymer. Consequently, coupling agents capable of forming this chemical bond are important components of a reinforced polymeric composition. It has also been discovered that various compounds used as coupling agents provide compositions of varying degrees of reinforcement as evidenced by mechanical properties of the finished product. Variation in degrees of reinforcement is even more pronounced when the properties of wet compositions are measured. Some polymeric compositions lose nearly all their increased strength when tested after a four hour boil in water whereas others retain a substantial portion of their mechanical properties.

It is an object of this invention to provide reinforced polymeric compositions compositions. It is a further object of this invention to provide reinforced polymeric compositions having increased flexural strength and modulus. It is a still further object of this invention to provide a method for reinforcing polymeric compositions. It is another object of this invention to provide carboxylated long-chain alkylene and alkenylene alkoxysilanes as novel compositions of matter. Additional objects, benefits, and advantages will become apparent as the detailed description of the invention proceeds.

COUPLING AGENTS

Carboxylated long-chain alkylene and alkenylene alkoxysilanes according to the present invention are defined by the following generic formula

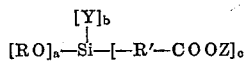

wherein R is an alkyl radical, Y and Z are hydrogen or hydrocarbyl radicals, R' is an alkylene or alkenylene radical having from 8 to 20 carbon atoms, $a$ is an integer from 1 to 3, $b$ is an integer from 0 to 2, and $c$ is an integer from 1 to 3, provided that the sum of $a+b+c$ equals 4. Examples of compounds include: methyl 4-triethoxysilyltetradecanoate, ethyl 3-tripropoxysilyldecanoate, phenyl 12-diethylbutoxysilyllaurate, n-butyl 20-phenyldimethoxysilyleicosanoate, isopropyl 18-trimethoxysilylstearate, ethyl 7-methyldiethoxysilyl-9-decanoate, and benzyl 13-ethyldiethoxysilylhexadecanoate. Preferred compounds according to the above formula are those where R is an alkyl radical of not more than four carbon atoms, Y and Z are alkyl radicals having not more than four carbon atoms, $a$ is an integer from 2 to 3, $b$ is a integer from 0 to 1, and $c$ is 1, provided that the sum of $a+b+c$ equals 4. The esters, i.e. those compounds wherein Z is not a hydrogen atom, are preferred coupling agents in base-catalyzed polymerizations to avoid excess consumption of catalyst in neutralizing the free carboxylic acid. In other polymerizations, the acid and ester compounds can be used interchangeably.

The long-chain alkylene or alkenylene group, designated as R' in the generic formula, is an important feature of the coupling agents of this invention. Compounds having such a group, in addition to providing reinforced polymers, also impart a wetting action to a monomer-coupler-mineral slurry, thereby making the slurry more fluid and permitting the incorporation of even larger amounts of reinforcing agent with a consequent further improvement in mechanical properties of a finished polymeric composition. In addition to a wetting action, it is theorized that the carboxylated long-chain alkoxysilanes provide a more hydrophobic polymer-coupler-mineral bond, thereby making the corresponding reinforced polymers more water-resistant and less susceptible to the plasticizing action of water. The R' group is preferably restricted to substantially straight-chained radicals in order to exclude all divalent radicals with branched side chains having more than two carbon atoms per chain. It is theorized that side chains longer than two carbon atoms cause a steric hindrance of the coupler-mineral reaction, thus decreasing the degree of reinforcement possible by the practice of this invention. The R' group can range from 8 to 20 or more carbon atoms, and preferably from 10 to 20 carbon atoms. Examples of particularly preferred esters include: ethyl 11-triethoxysilyl undecanoate, n-butyl 11-triethoxysilyl undecanoate, methyl 13-trimethoxysilyl hexadecanoate, and n-propyl 10-methyldiethoxysilyl stearate.

Compounds described in the generic formula are prepared by reacting a chlorosilane or a hydrocarbyl chlorosilane with an alkenoic acid, alkylnoic acid, or ester derivatives thereof. The reaction is conducted in the presence of a platinum metals catalyst such as chloroplatinic acid. The silane reactant must contain at least one chloro radical and at least one hydrogen atom, both of which must be attached directly to the silicon atom. The remaining two valence bonds of the silicon may be occupied by additional alkoxy or hydrogen radicals and by hydrocarbyl radicals. The hydrocarbyl radical itself is involved in neither the silane-acid reaction nor in the coupler-mineral reaction and hence can be any unreactive substituent. Since alkyl chlorosilanes are readily available and since alkyl groups are satisfactorily unreactive, a preferred hydrocarbyl substituent is an alkyl radical. The carboxylated alkoxysilane is subsequently formed from the carboxylated chlorosilane by reacting the chlorosilane with an alcohol. Examples of silanes suitable for the preparation of carboxylated alkoxysilanes of this invention include trichlorosilane, methyl dichlorosilane, ethylmethyl chlorosilane, and phenyl dichlorosilane.

The unsaturated acid compound can be either an alkenoic or alkynoic acid or an ester derivative thereof. The ester substituents can be hydrocarbyl radicals such as alkyl, cycloalkyl, aryl, alkaryl, or aralkyl radicals, and preferably alkyl radicals having up to eight carbon atoms. With regard to alkenoic and alkynoic compounds, the olefinic or acetylenic chain attached to the carboxyl group can be either straight or branched. Preferably, the chain is substantially straight, i.e. side chains are not more than two carbon atoms in length, and the unsaturated carbon to carbon bonds are preferably located not more than one carbon atom from the terminal carbon atom in the chain. With regard to dialkenoic compounds, the double bonds are preferably conjugated with one of the bonds attached to the terminal carbon atom. Regarding the length of the hydrocarbon chains, the chains can vary in length from eight to twenty or more carbon atoms. Preferably, the range of carbon atoms in the chain varies from 10 to 20 carbon atoms. Carboxylic compounds suitable for use in the preparation of the carboxylated long-chain alkylene and alkenylene alkoxysilanes include methyl 9-decenoate, decynoic acid, methyl 8-decenoate, benzyl 10-undecenoate, cyclohexyl 10-undecenoate, isopropyl 15-hexadecenoate, 10-undecenoic acid, ethyl tetradecenoate, isopropyl 10-undecenoate, p-tolyl ester of 12-tetradecynoic acid, and cyclohexyl 9-decynoate.

The silane and unsaturated acid compound when combined in the presence of chloroplatinic acid or a similar catalyst produce an exothermic reaction. Control of the reaction is achieved by adding one of the reactants, such as the silane, to the other reactant in a dropwise manner with stirring. After combination of the reactants, it may be desirable to heat the reactant mixture for a period of time to increase the product yield. Gentle refluxing for a few hours has proved advantageous in my syntheses. The carboxylated chlorosilane product can be separated from the reaction mixture by fractional distillation under reduced pressure, the temperature at which the silane product distills being determined by the pressure within the distillation flask and by the particular silane produced. Alternatively, the crude unpurified carboxylated chlorosilane can be reacted with an alcohol by simple mixing of the two reactants followed by some procedure for separating the carboxylated alkoxysilane from the reaction mixture.

POLYMERS

Polymers useful in the production of reinforced compositions are those synthetic resins formed from monomers which can react with the carboxylated alkoxysilanes of this invention. Included are monomeric acids, alcohols, esters, amines, imides, amides, lactams, and isocyanates capable of reacting with the carboxyl or carbalkoxyl group of the coupler. Other polymer systems utilizing a promoter, regulator, inhibitor, stabilizer, or other additive which is chemically incorporated into the polymer chain upon polymerization can also be used in this invention if the additive contains functional groups which are also reactive with the carboxylated alkoxysilane coupler. Examples of polymer systems useful in the subject invention include polyamides such as nylon 6, nylon 6, 6, and higher polyamides, phenol-formaldehyde resins, melamines, polyurethanes, polyglycols, styrene-maleic anhydride copolymers, polycarbonate resins, epoxy resins, and the polystyrene resins.

REINFORCING AGENTS

The reinforcing agents of the present invention are selected from a wide variety of minerals, primarily metals, metal oxides, metal salts such as metal aluminates and metal silicates, other siliceous materials, and mixtures thereof. A preferred mineral mixture for use in this invention is one which contains a major amount, i.e. more than 50% by weight, of metal silicates or siliceous materials. Such materials are preferred because of the ease with which they are coupled to the polymer. However, other substances such as alumina, which are coupled to a polymer at higher levels of coupling agent, can be used as reinforcing components either singly or preferably combined with other minerals which are more susceptible to coupling, and more preferably combined in minor amounts, i.e. percentages of less than 50% of the total reinforcing material. An example of such a material useful as a reinforcing agent, with which alumina can be mixed, is feldspar, an igneous crystalline mineral containing about 67% $SiO_2$, about 20% $Al_2O_3$, and about 13% alkali metal and alkaline earth metal oxides. Feldspar is one of the preferred reinforcing agents of this invention and a feldspar-alumina mixture is also useful. Other materials particularly preferred as reinforcing agents are: wallastonite, which is a calcium metasilicate; mullite, an aluminum silicate; asbestos, such as chrysotile, a hydrated magnesium silicate; crocidolite; and other calcium magnesium silicates; and a fibrous aluminum silicate, $Al_2SiO_5$. Other useful reinforcing agents include: quartz and other forms of silica, such as silica gel, glass fibers, cristobalite, etc.; metals, such as aluminum, tin, lead, magnesium, calcium, strontium, barium, titanium, zirconium, vanadium, chromium, manganese, iron, cobalt, nickel, copper, and zinc; metal oxides in general, such as oxides of aluminum, tin, lead, magnesium, calcium, strontium, barium, titanium, zirconium, vanadium, chromium, manganese, iron, cobalt, nickel, copper and zinc; heavy metal phosphates, sulfides and sulfates; and basic minerals and mineral salts such as spodumene, mica, montmorillonite, kaolinite, bentonite, hectorite, beidellite, attapulgite, chrysolite, garnet, saponite, and hercynite.

The term "mineral" as used in this disclosure is used to include all the classes of inorganic materials described above; consequently the term "mineral" is used synonomously with "reinforcing agent" to include all the classes of inorganic materials defined by the above examples, whether naturally occurring or synthetically produced.

The amount of reinforcing agent to be used in the preparation of the polymeric composition varies over a wide range with the maximum content being limited primarily by the ability of the polymer to bind the reinforcing medium into a cohesive mass. Techniques subsequently described herein have enabled me to prepare polymeric compositions containing as much as 90 or 95% by weight reinforcing agent.

The lower range of reinforcing mineral concentration is limited only insofar as it is necesary to have sufficient mineral present to effect an improvement in physical properties of the polymeric composition. Consequently, mineral concentrations as low as 5% by weight or less can be used, particularly if the finished composition is to be extruded into filament form. A preferable lower limit for the mineral reinforcing agent, especially in the case of molded compositions, is 40% by weight of the total composition, and more preferably 50% by weight. Suitable values, therefore, for reinforcing agent concentration in the finished composition range from about 5 to about 95%, preferably from about 40 to about 95%, and more preferably from about 50 to about 90% by weight.

Particle shape and size of the reinforcing agent affect physical properties of the finished composition. In a preferred aspect of this invention, the reinforcing mineral is admixed with a monomer or prepolymer and subsequently cast into a mold where the polymer is formed and cured. In such a method, the viscosity of the monomer or prepolymer-mineral slurry becomes a limitation on the maximum amount of reinforcing agent which can be used, i.e. too high a mineral concentration produces mixtures too viscous to cast into molds. This limitation on mineral concentration imposed by the viscosity is in turn dependent upon the shape of the particulate mineral. For example, spherical particles do not increase the viscosity of the monomer mixture as much as fibrous materials. By adjusting the particle shape of a mineral reinforcer and thereby controlling the viscosity of the monomer mixture, it is possible to prepare improved castable or moldable polymeric compositions containing a very large amount of reinforcing mineral.

Another factor which has an effect on the upper limit of mineral concentration is the particle size distribution of the mineral. A wide distribution of particle sizes provides a composition with a small amount of voids or spaces between the particles, thereby requiring less polymer to fill these spaces and bind the particles together. Proper combination of the two variables of particle shape and size distribution enables me to prepare the highly reinforced compositions of this invention.

Particle size distribution as previously noted is a variable which has an effect on the degree of mineral loading possible. Regarding particle size, generally particles which pass through a 60 mesh screen are small enough to be used in the compositions of this invention, although particles as large as $1,000\mu$ (18 mesh) can be used with equal or nearly equal success; regarding a lower limit on particle size, particles as small as $0.5\mu$ have been successfully employed and particles in the range of 200 to 400 millimicrons can also be used. More descriptive of suitable mineral particles than limits on particle size is a specification of particle size distribution. A suitable wide particle size distribution is as follows:

| | Percent |
|---|---|
| $250\mu$ or less (60 mesh) | 100 |
| $149\mu$ or less (100 mesh) | 90 |
| $44\mu$ or less (325 mesh) | 50 |
| $5\mu$ or less | 10 |

A narrower distribution also suitable for use in this invention is:

| | Percent |
|---|---|
| $62\mu$ or less (230 mesh) | 100 |
| $44\mu$ or less (325 mesh) | 90 |
| $11\mu$ or less | 50 |
| $8\mu$ or less | 10 |

A relatively coarse mixture useful in this invention has the following particle size distribution:

| | Percent |
|---|---|
| $250\mu$ or less (60 mesh) | 100 |
| $149\mu$ or less (100 mesh) | 90 |
| $105\mu$ or less (140 mesh) | 50 |
| $44\mu$ or less (325 mesh) | 10 |

A suitable finely divided mixture has the following particle size distribution:

| | Percent |
|---|---|
| $44\mu$ or less (325 mesh) | 100 |
| $10\mu$ or less | 90 |
| $2\mu$ or less | 50 |
| $0.5\mu$ or less | 10 |

These figures regarding particles size distribution should not be construed as limiting since both wider and narrower ranges of distribution will also be useful as well as both coarser and finer compositions. Rather these figures are intended as represenative illustrations of mineral compositions suitable for use in the reinforced polymeric compositions of this invention.

The reinforcing agents perform a dual function in the finished compositions. First, depending upon the material selected they may serve as an inexpensive diluent for the polymer, thereby lowering the cost of the final product. Secondly, and more important, these minerals, when bound to the polymer in accordance with this invention, produce compositions with physical properties far superior to those of unreinforced polymers, thereby permitting their use in applications heretofore unsuited for the reinforced polymers.

To achieve the benefits of this invention, namely the production of easily castable or moldable highly reinforced polymeric compositions plus lower costs from higher loadings of reinforcing minerals, it is necessary that the reinforcing agent be substantially granular in shape rather than fibrous. However a small amount of fibrous material may be incorporated into a polymer system if the amount of granular material is reduced by some proportionately larger amount. Alternatively, if castability is not required, larger amounts of fibrous material can be included in the composition, thereby reinforcing the final product to an even greater extent.

The most common fibrous reinforcing agent used is fibrous glass particles. These fibers are most easily incorporated into the polymeric composition when chopped into strands approximately 0.1 to 3 inches in length, and then either added to a prepolymer-coupler mixture as discrete particles or formed into a mat upon which the prepolymer is poured prior to polymerization. Such methods of incorporation of glass fibers are well known in the art and are mentioned here to demonstrate that the granularly reinforced polymers of this invention can be additionally reinforced by incorporation of fibrous materials according to techniques well known in the art or according to the procedure described herein as applicable to granular reinforcing agents.

PREPARATION OF REINFORCED POLYMERIC COMPOSITIONS

Bonding of the reinforcing medium to the polymer is achieved by means of a carboxylated alkoxysilane containing at least one carboxyl radical for reaction with a monomeric system during polymerization and at least one alkoxylsilyl radical for reaction with the mineral. The mineral and coupler are joined by mixing them in an aqueous or anhydrous medium. Theoretically, the alkoxy radicals react with hydroxyl groups appended to the silicous mineral surface, thereby splitting off an alcohol and producing the very stable siloxane linkage,

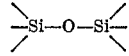

In some situations, a suspension of mineral in aqueous medium is advantageous in achieving good contact of mineral and coupler, especially if the mineral is in very finely divided form. In such as case, the alkoxysilane may be first converted to a silanol, i.e.

which then reacts with surface hydroxyl groups to produce the siloxane linkage. The reluctance of some materials, such as alumina, to acquire surface hydroxyl groups may explain why they are not as readily chemically bound to the polymer as some other minerals. Alumina is preferably mixed with siliceous minerals which can be so bound to produce compositions of high strength and modulus. Regardless of any theoretical explanation advanced herein, to which I do not intend to be bound, the alkoxysilane group is reacted with the mineral, forming a chemical bond therebetween. This reaction of mineral and coupler can be carried out separately and the mineral-coupler adduct subsequently added to the monomer system, or the reaction can be carried out in the presence of the monomer prior to polymerization; or the coupler can be bound to the polymer during a polymerization, thereby producing a polymer with appended mineral-reactive groups which can subsequently be reacted with the mineral to produce a reinforced composition.

The amount of coupler with which the reinforcing agent is treated is relatively small. As little as one gram of coupling agent per 1,000 grams of reinforcing agent produces a polymeric composition with physical properties superior to those of a polymeric composition containing an untreated filler. Generally, quantities of coupler in the range of 3 to 20 grams per 1,000 grams of reinforcing agent have been found most satisfactory although quantities in excess of that range may also be used with no detriment to the properties of the finished product.

Polymerizations are carried out by methods well known to those skilled in the art using appropriate catalysts, promoters, regulators, stabilizers, curing agents, etc., necessary to achieve the polymerization of a selected monomer or monomers.

Regarding the preparation of castable compositions, it may be advisable particularly in the case of high loadings of reinforcing agents where a slight increase in viscosity of the monomer-mineral mixture cannot be tolerated, to provide means for injection of the catalyst, or alternately the promoter, into the monomer as it is being poured into the mold. Such a technique completely prevents an increase in viscosity of the monomer mixture due to polymerization before the mixture is cast. Another technique useful with high loadings of reinforcing agents which aids in overcoming the difficulties presented by high viscosity is a pressurized injection of the monomer mixture into the mold.

Such techniques, either singly or in combination with one another, are useful in obtaining the highly reinforced compositions of this invention.

Processing and molding techniques applicable to unfilled or unreinforced polymeric systems can be used in the practice of this invention. For instance, compression molding, transfer molding, injection molding, and blow molding are not rendered inoperative because of the presence of coupler and reinforcing agent.

Utilization of the procedures described above and in the following examples permits the preparation of granularly reinforced polymeric compositions possessing flexural strengths significantly greater than the corresponding unreinforced polymers. Since the flexural strength of a filled polymer does not increase and often decreases with increasing concentrations of filler above 50%, even more significant improvement is achieved at higher mineral concentrations, e.g. 60% and greater. The invention will be more clearly understood from the detailed description of the following specific examples which set forth some of the preferred coupling agents and their method of preparation, some of the preferred polymeric compositions, the methods of preparing them, and the superior physical properties attained by the practice of this invention.

EXAMPLE 1

To a quantity of 46 grams of methyl 10-undecenoate is added 2 ml. of a 0.1 M solution of chloroplatinic acid in isopropanol. To this solution 45 grams of trichlorosilane is added dropwise with stirring. After addition of the silane, the mixture is refluxed at 85° C. for one hour. Upon cooling to room temperature, 200 ml. of methanol is added slowly with stirring and the mixture is stirred for two hours to insure complete conversion from the halosilane to the alkoxysilane. Excess methanol and HCl byproduct are removed by distillation at reduced pressure. Upon removal of most of the volatile materials in the reaction mixture, the mixture is warmed slightly to about 40° to 50° C. and the distillation continued to increase removal of unreacted components. The reaction residue is identified as methyl 11-(trimethoxysilyl)undecanoate.

A quantity of 300 grams of ε-caprolactam is melted in a flask to which is added with stirring 780 grams of mullite (200+ mesh) and 4.0 grams of methyl 11-(trimethoxysilyl)undecanoate. The mixture is heated to 150° C. under a slight vacuum until 80 grams of caprolactam is removed. The vacuum is released and the mixture allowed to cool to about 115° C., at which time 7 grams of Mondur MR (a polyfunctional isocyanate) is added and mixed for several minutes. To this mixture, 8.3 ml. of a 3 M solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 175° C. for 1.5 hours. The finished composition contains 78% reinforcing agent.

EXAMPLE 2

The procedure described in Example 1 is followed except that the monomer-mineral-coupler mixture is polymerized at 150° C. for 2 hours.

EXAMPLE 3

The procedure described in Example 1 is followed except that the monomer-mineral-coupler mixture is polymerized at 200° C. for 1 hour.

EXAMPLE 4

A quantity of 300 grams of ε-caprolactam is melted in a flask to which is added with stirring 750 grams of mullite (+325 mesh), 1.5 ml. of water, and 4.5 grams of methyl 11-(trimethoxysilyl)undecanoate. The mixture is heated to 150° C. under a slight vacuum until the volatile materials and 50 grams of caprolactam are removed. The vacuum is released and the mixture allowed to cool to about 115° C.; 7 grams of Mondur MR (a polyfunctional isocyanate) is then added and mixed for several minutes. To this mixture 8.3 ml. of a 3 M solution of ethylmagnesium bromide in diethyl ether is added slowly with stirring. Again a vacuum is applied until all the ether and ethane are removed as evidenced by the complete dispersal of the catalyst in the mixture. After release of the vacuum, the slurry is poured into a mold preheated to 175° C. and polymerized at this temperature for 1.5 hours. The finished composition contains 75% reinforcing agent.

EXAMPLE 5

A quantity of 250 grams of ε-caprolactam is melted in a flask to which is added with stirring 800 grams of mullite (+35 to 325 mesh), 1.5 ml. of water, and 4.1 grams of methyl 11-(trimethoxysilyl)undecanoate. The mixture is heated to 150° C. under a slight vacuum until the volatile materials and 50 grams of caprolactam are removed. The vacuum is released and the mixture allowed to cool to about 115° C.; 3.7 grams of an 80/20 mixture of 2,4- and 2,6-diisocyanatotoluene (TD–80) is then added and mixed for several minutes. To this mixture 8.3 ml. of a 3 M solution of ethylmagnesium bromide in diethyl ether is added slowly with stirring. Again a vacuum is applied until all the ether and ethane are removed as evidenced by the complete dispersal of the catalyst in the mixture. After release of the vacuum, the slurry is poured into a mold preheated to 150° C. and polymerized at this temperature for 2 hours. The finished composition contains 80% reinforcing agent.

EXAMPLE 6

A quantity of 200 grams of ε-caprolactam is melted in a flask to which is added with stirring 816 grams of mullite (+200 mesh) and 7.1 grams of methyl 11-(trimethoxysilyl)undecanoate. The mixture is heated to 150° C. under a slight vacuum until 16 grams of caprolactam are removed. The vacuum is released and the mixture allowed to cool to about 115° C.; 7 grams of Mondur MR (a polyfunctional isocyanate) is then added and mixed for several minutes. To this mixture 8.3 ml. of a 3 M solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 175° C. and polymerized at this temperature for 1.5 hours. The finished composition contains 81.6% reinforcing agent.

EXAMPLE 7

A quantity of 350 grams of ε-caprolactam is melted in a flask to which is added with stirring 700 grams of mullite (+200 mesh), 10 grams of glass fibers ¼″ to ½″ in length, and 4.6 grams of methyl 11-(trimethoxysilyl)undecanoate. The mixture is heated to 150° C. under a slight vacuum until 50 grams of caprolactam is removed. The vacuum is released and the mixture allowed to cool to about 115° C.; 3.7 grams of an 80/20 mixture of 2,4- and 2,6-diisocyanato-toluene (TD–80) is then added and mixed for several minutes. To this mixture 8.3 ml. of a 3 M solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 175° C. and polymerized at this temperature 1.5 hours. The finished composition contains 71% reinforcing agent.

EXAMPLE 8

A quantity of 350 grams of ε-caprolactam is melted in a flask to which is added with stirring 710 grams of calcium metasilicate (+325 mesh) and 4.0 grams of methyl 11-(trimethoxysilyl)undecanoate. The mixture is heated to 150° under a slight vacuum until 60 grams of caprolactam is removed. The vacuum is released and the mixture allowed to cool to about 115° C.; 7 grams of Mondur MR (a poly-functional isocyanate) is then added and mixed for several minutes. To this mixture 8.3 ml. of a 3 M solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 200° C. and polymerized at this temperature for 1 hour. The finished composition contains 71% reinforcing agent.

EXAMPLE 9

A quantity of 300 grams of ε-caprolactam is melted in a flask to which is added with stirring 750 grams of feldspar (+200 mesh) and 4.0 grams of methyl 11-(trimethoxysilyl)undecanoate. The mixture is heated to 150° C. under a slight vacuum until 50 grams of caprolactam are removed. The vacuum is released and the mixture allowed to cool to about 115° C.; 4 grams of an 80/20 mixture of 2,4- and 2,6-diisocyanatotoluene (TD–80) is then added and mixed for several minutes. To this mixture 8.3 ml. of a 3 M solution of ethylmagnesium bromide in diethyl ether is added slowly with stirring. Again a vacuum is applied until all the ether and ethane are removed, as evidenced by the complete dispersal of the catalyst in the mixture. After release of the vacuum, the slurry is poured into a mold preheated to 150° C. and polymerized at this temperature for 2 hours. The finished composition contains 75% reinforcing agent.

EXAMPLE 10

In this example, mechanical properties of the reinforced polymeric compositions of this invention are reported. The flexural strength and modulus properties are determined in accordance with ASTM D–790–61. Values for wet strength and modulus are reported on samples subjected to an immersion in boiling water for the number of hours indicated in parentheses following each value for flexural strength. Composition A is an unfilled, unreinforced polycaprolactam prepared according to Example 1 of this disclosure except that no reinforcing agent or coupling agent is used.

Composition B is a filled polycaprolactam prepared according to Example 9 of this disclosure except that no coupling agent was used and except that the composition contains only 70% filler. Compositions prepared with 75% loadings of filler had mechanical properties markedly inferior to Composition B. The numerical designations of polymeric compositions indicate compositions prepared in the manner described in the corresponding examples.

TABLE

| Polymeric composition | Average Flexural Properties | | | | |
|---|---|---|---|---|---|
| | Strength×10³ | | | Modulus×10⁵ | |
| | Dry | Wet | (Hours boil) | Dry | Wet |
| A | 12.0 | 3.3 | (4) | 0.30 | 0.09 |
| B | 7.0 | 2.8 | (4) | 1.2 | 0.21 |
| 1 | 25.0 | 11.0 | (24) | 3.1 | 0.96 |
| | | 10.4 | (48) | | 0.97 |
| 2 | 26.2 | 13.3 | (24) | 3.1 | 1.2 |
| | | 13.0 | (48) | | 1.1 |
| | | 13.3 | (68) | | 1.1 |
| | | 13.6 | (138) | | 1.2 |
| 3 | 26.5 | 10.6 | (24) | 2.8 | 0.81 |
| | | 10.9 | (48) | | 0.88 |
| | | 11.8 | (68) | | 0.95 |
| 4 | 26.8 | 11.2 | (24) | 2.6 | 0.67 |
| | | 12.0 | (72) | | 0.84 |
| 5 | 18.6 | 9.6 | (24) | 3.6 | 1.4 |
| | | 9.9 | (48) | | 1.4 |
| | | 9.4 | (68) | | 1.4 |
| 6 | 22.7 | 10.2 | (24) | 3.5 | 1.1 |
| | | 10.4 | (48) | | 1.3 |
| 7 | 26.7 | 11.1 | (24) | 2.2 | 0.58 |
| | | 11.3 | (48) | | 0.62 |
| 8 | 27.5 | 7.1 | (24) | 1.9 | 0.83 |
| 9 | 22.7 | 12.2 | (24) | 2.4 | 0.91 |
| | | 12.1 | (48) | | 0.93 |
| | | 12.3 | (96) | | 0.94 |

The above table demonstrates the improved mechanical properties achieved by the coupling capability of the alkoxy silanes of this invention. Dry flexural strengths of the reinforced compositions are uniformly improved over the filled compositions regardless of variation within the scope of this invention of substituent groups on the coupling agent. Flexural modulus is also improved. The most significant improvement, however, is a retention of strength and modulus of the reinforced compositions after boiling in water. Measurement of wet and dry strengths and modulus for composition B show that the filled composition lost 60% of its flexural strength and 82% of its modulus after only a 4 hour boil in water. The reinforced compositions lost significantly less strength and modulus even though subjected to 2 and 3 day immersions in boiling water.

EXAMPLE 11

A quantity of 190 grams of wollastonite is treated with 2.0 grams of ethyl 12-(triethoxysilyl)tetradecenoate in the presence of water. The water is removed from the treated mineral by vacuum distillation at 130° to 140° C. The wollastonite-tetradecenoate adduct is added to a 1 liter solution of pyridine containing 114 grams of bisphenol A. With the temperature of the solution maintained at 25° to 35° C., phosgene is introduced at the rate of 5 grams per minute with vigorous stirring. After 10 minutes, the viscosity of the solution is increased substantially and the introduction of phosgene is stopped. The product, a low-molecular weight polycarbonate reinforced with wollastonite, is precipitated from the solution by the addition of methanol. A quantity of 10 grams of maleic anhydride is then blended into the polymer and the mixture compression-molded at 250° C. and 2,000 p.s.i. for 15 minutes. The finished product contains 51% reinforcing agent. This reinforced polycarbonate resin has mechanical properties substantially superior to an unreinforced polycarbonate resin.

The improved mechanical properties of the reinforced polymers permit their use in many applications in which the unreinforced polymers are unsuitable, such as the fabrication of tables, chairs, and other furniture and furniture components, heavy duty equipment housings, automobile components, and building construction components. Further, compositions of this invention are generally useful in those applications in which unreinforced polymers have been useful but where increased strength and rigidity are desirable features.

Although the invention has been described in terms of specified embodiments which are set forth in considerable detail, it should be understood that this was done for illustrative purposes only, and that the invention is not necessarily limited thereto since alternative embodiments and operating techniques will become apparent to those skilled in the art in view of this disclosure. For instance, these compositions can be "filled" with a mineral filler, i.e. with additional inorganic particulate material which is not chemically bound to the polymer as is the reinforcing agent. As an example, a mold may be loosely filled with a mixture of large (approximately 1 centimeter in diameter) irregular mineral particles and sand, and a monomer-mineral slurry as described in the preceding examples can be poured into the mold, thereby "wetting" the large particles in the mold and filling the space between the particles before polymerization occurs. In such a case the reinforced polymer binds the sand and larger aggregates together in much the same way as cement binds sand and gravel together to form a finished concrete. As an alternate method, the mineral aggregate in the mold may be treated with a suitable coupling agent prior to the introduction of the monomer-mineral slurry so that upon casting, the entire mineral mixture is chemically bound to the polymer, thereby producing a reinforced composition wherein the reinforcing medium can exceed 95% of the total composition.

Accordingly, these and other modifications are contemplated which can be made without departing from the spirit of the described invention.

What is claimed is:
1. A process of preparing reinforced polymeric compositions comprising:
   (1) reacting an alkyl 11-(trialkoxysilyl)undecanoate with an inorganic reinforcing abent to prepare a reinforcing agent adduct having appended carboxyl groups, and
   (2) conducting a base-catalyzed, substantially anhydrous anionic polymerization of $\epsilon$-caprolactum in the presence of said adduct to incorporate the carboxyl groups of the adduct into the polymer molecule, said adduct comprising from about 5 to about 95 percent by weight of the monomer-adduct mixture.

2. A reinforced polymeric composition consisting essentially of the reaction product of
   (a) from about 5 to about 95% by weight of said composition of the reaction product of an inorganic reinforcing agent and a carboxylated alkoxysilane of the formula $$[RO]_a-\underset{\underset{[R'-COOZ]_c}{|}}{\overset{[Y]_b}{Si}}$$

where R is an alkyl radical, Y and Z are selected from the group consisting of hydrogen and hydrocarbyl radicals, R' is selected from the group consisting of substantially straight-chained alkylene and alkylene radicals having from 8 to 20 carbon atoms, $a$ is an integer from 1 to 3, $b$ is an integer from 0 to 2, and $c$ is an integer from 1 to 3, provided that the sum of $a+b+c$ equals 4, and
   (b) a polyphenylene carbonate formed from phosgene and a bis-phenol.

3. A reinforced polymeric composition consisting essentially of the reaction product of
   (a) from about 5 to about 95% by weight of said composition of the reaction product of an inorganic reinforcing agent and a carboxylated alkoxysilane of the formula

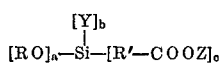

where R is an alkyl radical, Y and Z are selected from the group consisting of hydrogen and hydrocarbyl radicals, R' is selected from the group consisting of substantially straight-chained alkylene and alkenylene radicals having from 8 to 20 carbon atoms, $a$ is an integer from 1 to 3, $b$ is an integer from 0 to 2, and $c$ is an integer from 1 to 3, provided that the sum of $a+b+c$ equals 4, and (b) a polyamide produced by the base-catalyzed, substantially anhydrous polymerization of $\epsilon$-caprolactam.

References Cited
UNITED STATES PATENTS

| | | | |
|---|---|---|---|
| 2,874,139 | 2/1959 | Symons | 260—78 |
| 3,017,391 | 2/1962 | Mothus et al. | 260—78 |
| 3,086,962 | 4/1963 | Mothus et al. | 260—78 |
| 3,214,414 | 10/1965 | Waltersperger | 260—78 |

HAROLD D. ANDERSON, Primary Examiner

U.S. Cl. X.R.

260—78, 37, 59, 2, 77.5, 78.5, 93.5, 41, 89.5, 80

PO-1050
(5/69)

UNITED STATES PATENT OFFICE
CERTIFICATE OF CORRECTION (Page 1 of

Patent No. 3,488,319      Dated January 6, 1970

Inventor(s) Robert E. Miller

It is certified that error appears in the above-identified patent and that said Letters Patent are hereby corrected as shown below:

In the Abstract Of The Disclosure, Column 1, line 13, "cardboxylated" should read --- carboxylated --- . See Amendment A, page 2.

Column 1, line 58, "carboxy" should read --- carboxyl --- .
    See specification, page 2, line 2.

Column 2, line 48, "in" should read --- is --- .
    See specification, page 3, line 29.

Column 3, line 1, the second "compositions" should be deleted.
    See specification, page 4, line 20.

Column 3, line 33, "a" should read --- an --- .
    See specification, page 5, line 17.

Column 3, line 70, "alkylnoic" should read --- alkynoic --- .
    See specification, page 6, line 22.

Column 5, line 29, "wallastonite" should read --- wollastonite --- .
    See specification, page 9, line 31.

Column 7, line 8, "reinforced" should read --- unreinforced --- .
    See specification, page 13, line 28.

Column 7, line 46, 47, "silicous" should read --- siliceous --- .
    See specification, page 14, line 31.

Column 7, line 55, "as" should read --- a --- .
    See specification page 15, line 5.

Column 10, line 26, insert "for" after temperature.
    See specification, page 20, line 27.

PO-1050
(5/69)

UNITED STATES PATENT OFFICE
CERTIFICATE OF CORRECTION

Patent No.     3,488,319        Dated    January 6, 1970

Inventor(s)     Robert E. Miller

It is certified that error appears in the above-identified patent and that said Letters Patent are hereby corrected as shown below:

IN THE CLAIMS:

Claim 1, line 4, "abent" should read --- agent --- .
      See our Claim 12.

Claim 2, line 12, "alkylene" (second occurrence) should read
      --- alkenylene --- . See our Claim 23 in Acknowledgement
      of Interview.

Signed and sealed this 18th day of April 1972.

(SEAL)
Attest:

EDWARD M. FLETCHER, JR.
Attesting Officer

ROBERT GOTTSCHALK
Commissioner of Patents